United States Patent [19]

Stedron et al.

[11] Patent Number: 4,665,654
[45] Date of Patent: May 19, 1987

[54] WEATHER-TIGHT SWITCHBOARD CABINET

[75] Inventors: Horst Stedron, Herborn; Lothar Lehr, Burbach, both of Fed. Rep. of Germany

[73] Assignee: Rittal-Werk Rudolf Loh GmbH & Co. KG, Fed. Rep. of Germany

[21] Appl. No.: 787,739

[22] Filed: Oct. 15, 1985

[30] Foreign Application Priority Data

Nov. 9, 1984 [DE] Fed. Rep. of Germany ....... 3440899

[51] Int. Cl.$^4$ .............................................. E06B 7/16
[52] U.S. Cl. ...................................... 49/484; 49/401; 49/475
[58] Field of Search ................. 49/475, 483, 486, 488, 49/490, 484, 401, 402, 400; 312/296; 220/221, 226, 222; 52/212

[56] References Cited

U.S. PATENT DOCUMENTS

| | | | |
|---|---|---|---|
| 2,482,983 | 9/1949 | Lambert | 49/402 |
| 2,633,613 | 4/1953 | MacGregor | 49/484 |
| 3,299,574 | 1/1967 | Alexeff | 49/486 |
| 4,130,966 | 12/1978 | Kujawa | 49/401 |

Primary Examiner—Kenneth J. Dorner
Assistant Examiner—Gerald A. Anderson
Attorney, Agent, or Firm—Thomas W. Speckman; Ann W. Speckman

[57] ABSTRACT

The present invention relates to a switchboard cabinet comprising a box-like cabinet body with an opening, a door which seals the opening of the cabinet, and a door frame provided in the opening of the cabinet connected to the inner panels of the cabinet body, whereby when the door is closed, a frame sealing member in the door frame bears against a sealing element provided inside the door, and the door is provided with a continuous inwardly bent perimeter flange at a right angle to the surface of the door. The joint between the cabinet body and the door, when it is closed, may be completely sealed from the weather by means of a cover strip fastened in a recess between the cabinet body and door frame which extends over and beyond the door and has a sealing lip which seals against the perimeter flange of the cabinet door, so that the cabinet is suitable for outdoor installation.

25 Claims, 3 Drawing Figures

WEATHER-TIGHT SWITCHBOARD CABINET

BACKGROUND OF THE INVENTION

This invention relates to a switchboard cabinet comprising a box-like cabinet body with an opening, a door which closes the opening of the cabinet body, and a door frame mounted in the cabinet opening and attached to the inner panels of the cabinet body, so that when the door is closed, a portion of the door frame bears against a sealing element located on the inside of the cabinet door, and the door is further provided with a flange which extends around its perimeter at a right angle to the surface of the door.

Good sealing is not usually obtained with known switchboard cabinet designs of this type, especially in the area between the door and the cabinet body, particularly when the switchboard cabinet is installed outdoors. The joint between the upper horizontal edge of the door and the cabinet body is a critical area, since rain water, for example, may collect there and enter the switchboard cabinet when the door is opened.

SUMMARY OF THE INVENTION

A purpose of the present invention is to provide improved sealing for switchboard cabinets of the type referred to above, so that such cabinets may be installed outdoors, and the risk of rain water entering the cabinet body is diminished.

This objective is accomplished according to the present invention by the perimeter of the door being inset by providing, at least along the upper horizontal edge of the door, an extension extending beyond the outer portion of the cabinet body, so that the door frame with its vertical side members, forms a recess open toward the front of the cabinet body. A cover strip is attached to the cabinet body with the door frame, the cover strip projecting above and beyond the door when it is closed and has a sealing lip provided on the side of the cover strip facing the door, the lip bearing on the outer edge of the closed door facing it.

The cover strip covers the joint between the cabinet body and the door to insure that no water enters the cabinet body, and the sealing lip provides a means of positively sealing the area of the joint. In many cases, it is sufficient if the cover strip is provided only along the upper horizontal edge of the cabinet body. However, if complete sealing is to be achieved, then both vertical sides and the lower horizontal edge of the cabinet body should also be provided with a cover strip of this type to protect the entire joint between the door and cabinet body. When the cabinet door is closed, the sealing lip repels any water which may collect opposite it along the leading edge of the cabinet door, thus effectively preventing such water from entering the joint between the door and the cabinet body protected by the cover strip.

The cover strip is attached to the cabinet body by means of an arrangement wherein the cover strip and the door frame are bonded to the inside wall of the cabinet body, a recess formed between the cabinet body and the door frame being filled with bonding agent, and an attachment portion of the cover strip being imbedded in the bonding agent. This type of connection is particularly suitable in an embodiment wherein the cabinet body, the door frame and the cabinet door all comprise molded plastic components.

To prevent water from collecting in the joint between the cabinet body and the cover strip, in a further embodiment of the present invention, the upper surface of the cover strip is fitted flush with the outer edge of the cabinet body facing it.

In one embodiment of the present invention, both upper and lower sides of the cover strip are provided with intermediate shoulders acting as stops which bear on the front edges of the cabinet body and the door frame which delimit the recess in which the cover strip is attached, whereby the intermediate shoulders serve to limit the depth to which the cover strip can penetrate the recess; however, sufficient space remains in the recess to accommodate the bonding agent in which the narrower attachment portion of the cover strip is fully imbedded and assure that the door frame is sufficiently firmly attached to the cabinet body. In addition, a further advantageous feature is that the vertical side members of the door frame which delimit the door recess, on the side remote from the door, have a flange extending at a right angle to the door, and this flange serves to delimit the width of the recess at the end of the groove.

In a simplified embodiment of the design, the sealing lip and the cover strip may be molded in one piece.

If a cover strip of rigid material is preferred, in another embodiment of the present invention, the sealing lip may comprise a separate component with a projection fitted in a groove in the cover strip, whereby the sealing lip is fastened in this groove. The sealing lip constitutes a separate component in this version of the design and may be constructed from a material providing sufficient resiliency.

A feature to ensure that rain water runs off the cabinet is provided in a further embodiment, wherein a continuous drip flange is provided along the outer edge of the cover strip facing the cabinet door, and the sides of the cabinet body may be at an angle to the door opening which is slightly less than a right angle.

As far as the configuration of the door frame is concerned, the frame sealing member is connected to the side member of the door frame which delimits the opening by a connecting member adjacent and at a right angle to them, and the sealing element on the inside of the door is provided between two retaining members to provide space for a recess to accommodate the frame sealing member and also to maintain the retaining members spaced from the inner panels of the cabinet.

In order to maintain the joint between the cabinet body and the closed door as tight as possible, in one embodiment of the invention, the retaining member nearer the joint is shorter than the retaining member more remote from it.

BRIEF DESCRIPTION OF THE DRAWINGS

The invention will now be described in greater detail with reference to embodiments shown in the accompanying drawings, wherein.

DESCRIPTION OF THE PREFERRED EMBODIMENTS

Figure 1:
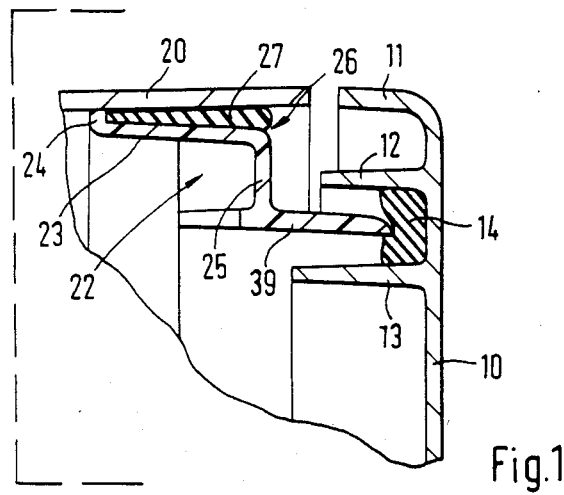
FIG. 1 shows a partial cross section of the upper horizontal edge of a known switchbox cabinet design, showing the area of the joint between the door and the cabinet body when the door is closed.

The drawings show only part of an upper panel of cabinet body 20, which may comprise a box-like form of molded plastic. The outer surface of the panel is designated 21. Door frame 22 is bonded in place in the front opening of cabinet body 20, as shown by the presence of bonding agent 27 in recess 26. Recess 26 is defined by a vertical side member, a lateral side member of door frame 22 and the inner panel of cabinet body 20, whereby the width at the inner portion of groove-shaped recess 26 is delimited by vertical side member 24 at a right angle to lateral side member 23. Connecting member 25 of door frame 22 extends to frame sealing member 39 which is displaced a distance from the inner panel of the cabinet body 20 and projects into the recess formed by cabinet body 20. Cabinet door 10 has perimeter flange 11 extending around its perimeter roughly at a right angle to the surface of door 10. In addition, on the inside of door 10, two retaining members 12 and 13 of different lengths are provided, between which sealing element 14 is maintained in position, whereby frame sealing member 39 of door frame 22 is compressed against sealing element 14 when cabinet door 10 is closed. Door frame 22 may comprise a one-piece frame section or may comprise four hollow sections mounted together.

It will be obvious that when a cabinet of the prior art design, as shown in FIG. 1, is installed outdoors, rain water, snow, etc., will collect on frame sealing member 39 and penetrate between cabinet body 20 and door 10.

Figure 2:
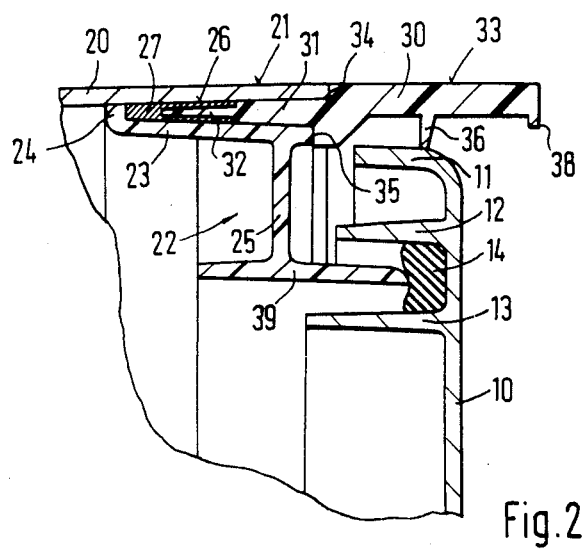
FIG. 2 shows a partial cross section corresponding to FIG. 1 with a cover strip having an integrally molded sealing lip attached to the cabinet according to this invention.

To prevent water leakage, cover strip 30 is provided according to the present invention. As shown in FIG. 2, opposite the portion of cabinet 20 on which cover strip 30 is mounted, perimeter flange 11 of cabinet door 10 is set back from cabinet side member 20 far enough to allow access to recess 26 from the front. Attachment portion 31 of cover strip 30 is inserted into recess 26 beyond a point where section 32 narrows. Narrow section 32 is imbedded in bonding agent 27 so that cover strip 30 is attached to door frame 22 and to the inner panel of cabinet body 20. Shoulders 34 and 35 on cover strip 30 limit the extent to which attachment portion 31 can penetrate recess 26, since they bear against the edges of cabinet body 20 and lateral side member 23 of door frame 22. Just as with known designs, frame sealing member 39 insures sealing fit with sealing element 14. Cover strip 30 projects over cabinet door 10 when it is closed and sealing lip 36 bears on perimeter flange 11 of cabinet door 10 opposite it. In the embodiment illustrated in FIG. 2, sealing lip 36 is formed on the lower side of cover strip 30 facing cabinet door 10. Outer surface 33 of cover strip 30 is flush with outer surface 21 of cabinet body 20 and the cover strip may be bent downward slightly to form less than a right angle to the opening of cabinet body 20. Continuous drip flange 38 is formed on the extending side of cover strip 30 facing cabinet door 10, to improve water run-off from cover strip 30.

Figure 3:
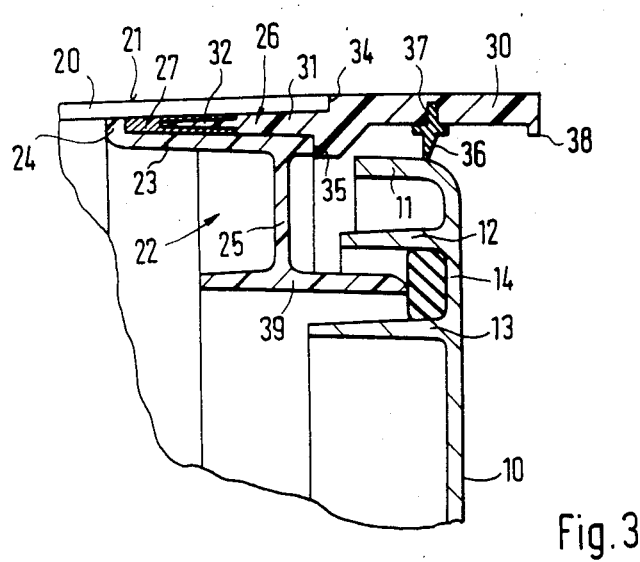
FIG. 3 shows a partial cross section corresponding to FIG. 2, wherein a sealing lip comprising a separate component is fastened in the cover strip.

In the embodiment illustrated in FIG. 3, sealing lip 36 is formed as a separate element maintained in place by a projection of the sealing lip element inserted in groove 37 in cover strip 30. In this case, sealing lip 36 has the same function as previously described, but as a separate element it may be of a different material, such as one that is more resilient than the material of cover strip 30.

When cabinet door 10 is closed, sealing lip 36 seals against perimeter flange 11 of cabinet door 10 opposite it, so that even when door 10 is closed, no water collects on it.

As door frame 22 extends around the opening of cabinet body 20, only the upper horizontal edge of cabinet body 20 may be provided with cover strip 30, or alternatively, three or all four sides of the cabinet may be provided with cover strips, which may in this case be completed by, or assembled in the form of a partial or complete framework.

We claim:

1. A switchboard cabinet comprising a plurality of panels forming a box-like cabinet body (20) with an opening, a door (10) capable of closing said opening and provided with a sealing element (14), and a door frame (22) extending around said opening and fastened to said panels, said door frame having a frame sealing member (39) which seals against said sealing element (14) when said door is in a closed position, said door also provided with a continuous perimeter flange (11) extending at a substantially right angle to said door, wherein: at least along an upper edge of said opening, said perimeter flange (11) is below an exterior surface (21) of said cabinet body (20); a recess (26) is provided at least along said upper edge of said opening between said door frame (22) and said cabinet body (20); a cover strip (30) is fastened in said recess (26), said cover strip (30) projecting beyond said door (10) when it is in said closed position, said cover strip (30) and said door frame (22) are bonded to said panels of said cabinet body (20) by means of a bonding agent (27) provided in said recess (26), and said cover strip (30) is fastened in said recess (26) by means of a narrow end section (32) imbedded in said bonding agent (27); and a lower side of said cover strip (30) facing said door (10) has a sealing lip (36) extending therefrom contacting the surface of said perimeter flange (11) of said door (10) when said door is in said closed position.

2. A switchboard cabinet according to claim 1, wherein said cover strip (30) has an exterior surface (33) flush with said exterior surface (21) of said cabinet body (20).

3. A switchboard cabinet according to claim 2, wherein an edge of said cabinet body (20) and an edge of said door frame (22) delimit said recess (26), and said cover strip (30) is provided with at least two shoulders (34,35) which abut said edges of said cabinet body (20) and said door frame (22) to limit the penetration of said cover strip (30) in said recess (26).

4. A switchboard cabinet according to claim 3, wherein said sealing lip (36) is formed in one piece with said cover strip (30).

5. A switchboard cabinet according to claim 3, wherein said cover strip (30) has a groove on its said lower side and said sealing lip (36) comprises a separate element having a projection fastened in said groove (37) of said cover strip (30).

6. A switchboard cabinet according to claim 3, wherein a continuous drip flange (38) is provided on a terminal end of said cover strip (30), said continuous drip flange (38) oriented substantially perpendicular to said cover strip (30) and facing said door (10).

7. A switchboard cabinet according to claim 6, wherein said door frame (22) comprises an upper side member (23) delimiting said recess (26) and a connecting member (25) connecting said upper side member (23) and said frame sealing member (39) and said sealing element (14) in said door (10) is provided between two retaining members (12,13) projecting at substantially right angles to said door (10).

8. A switchboard cabinet according to claim 7, wherein one said retaining member (12) is shorter than the other said retaining member (13) and more remote from said perimeter flange (11).

9. A switchboard cabinet according to claim 8, wherein an end of said upper side member (23) of said door frame (22) more remote from said door (10), is provided with a side member (24) which forms a closed end of said recess (26).

10. A switchboard cabinet according to claim 9, wherein said exterior surface (21) of said cabinet body (20) is at an angle of slightly less than 90° to said door (10) of said cabinet.

11. A switchboard cabinet according to claim 10, wherein said cabinet body (20), said door frame (22) and said cabinet door (10) all comprise molded plastic components.

12. A switchboard cabinet according to claim 11, wherein said cover strip (30) extends around three sides of said opening in said cabinet body (20).

13. A switchboard cabinet according to claim 11, wherein said cover strip (30) extends around all four sides of said opening in said cabinet body (20).

14. A switchboard cabinet comprising a plurality of panels forming a box-like cabinet body (20) with an opening, a door (10) capable of closing said opening and provided with a sealing element (14), and a door frame (22) extending around said opening and fastened to said panels, said door frame having a frame sealing member (39) which seals against said sealing element (14) when said door is in a closed position, said door also provided with a continuous perimeter flange (11) extending at a substantially right angle to said door, wherein: at least along an upper edge of said opening, said perimeter flange (11) is below an exterior surface (21) of said cabinet body (20); a recess (26) is provided at least along said upper edge of said opening between said door frame (22) and said cabinet body (20); a cover strip (30) is fastened in said recess (26), said cover strip (30) projecting beyond said door (10) when it is in said closed position; and a lower side of said cover strip (30) facing said door (10) has a sealing lip (36) extending therefrom contacting a surface of said perimeter flange (11) of said door (10) when said door is in said closed position.

15. A switchboard cabinet according to claim 1, wherein said cover strip (30) has an exterior surface (33) flush with said exterior surface (21) of said cabinet body (20).

16. A switchboard cabinet according to claim 1, wherein an edge of said cabinet body (20) and an edge of said door frame (22) delimit said recess (26), and said cover strip (30) is provided with at least two shoulders (34,35) which abut said edges of said cabinet body (20) and said door frame (22) to limit the penetration of said cover strip (30) in said recess (26).

17. A switchboard cabinet according to claim 1, wherein said sealing lip (36) is formed in one piece with said cover strip (30).

18. A switchboard cabinet according to claim 1, wherein said cover strip (30) has a groove on its said lower side and said sealing lip (36) comprises a separate element having a projection fastened in said groove (37) of said cover strip (30).

19. A switchboard cabinet according to claim 1, wherein a continuous drip flange (38) is provided on a terminal end of said cover strip (30), said continuous drip flange (38) oriented substantially perpendicular to said cover strip (30) and facing said door (10).

20. A switchboard cabinet according to claim 1, wherein said door frame (22) comprises an upper side member (23) delimiting said recess (26) and a connecting member (25) connecting said upper side member (23) and said frame sealing member (39) and said sealing element (14) in said door (10) is provided between two retaining members (12,13) projecting at substantially right angles to said door (10).

21. A switchboard cabinet according to claim 1, wherein said door frame (22) comprises an upper side member (23) delimiting said recess (26), and said upper side member (23) is provided with a side member (24) which forms a closed end of said recess (26).

22. A switchboard cabinet according to claim 1, wherein said exterior surface (21) of said cabinet body (20) is at an angle of slightly less than 90° to said door (10) of said cabinet.

23. A switchboard cabinet according to claim 1, wherein said cabinet body (20), said door frame (22) and said cabinet door (10) all comprise molded plastic components.

24. A switchboard cabinet according to claim 1, wherein said cover strip (30) extends around three sides of said opening in said cabinet body (20).

25. A switchboard cabinet according to claim 1, wherein said cover strip (30) extends around all four sides of said opening in said cabinet body (20).

* * * * *